US005971454A

United States Patent [19]

Baan et al.

[11] Patent Number: 5,971,454

[45] Date of Patent: Oct. 26, 1999

[54] ARTICLE HANDLER

[75] Inventors: Robert L. Baan, Wallkill; Joseph P. DeGeorge, Wappingers Falls; John R. Lankard, Jr., Poughkeepsie; Raymond H. Turcotte, Hopewell Junction, all of N.Y.

[73] Assignee: International Business Machines Corporation, Armonk, N.Y.

[21] Appl. No.: 09/005,136

[22] Filed: Jan. 9, 1998

[51] Int. Cl.[6] ...................... B25J 15/06

[52] U.S. Cl. ...................... 294/64.1; 294/87.1

[58] Field of Search ...................... 294/64.1, 65, 87.1; 29/743; 269/21; 414/627, 737, 752, 793, 797

[56] References Cited

U.S. PATENT DOCUMENTS

| | | | |
|---|---|---|---|
| 949,850 | 2/1910 | Smith . | |
| 1,062,579 | 5/1913 | Aylsworth . | |
| 1,431,702 | 10/1922 | Smend et al. | 294/64.1 X |
| 2,880,030 | 3/1959 | Horn | 294/65 |
| 2,956,769 | 10/1960 | Sigler et al. . | |
| 3,195,941 | 7/1965 | Morey | 294/64.1 |
| 3,523,707 | 8/1970 | Roth | 294/65 |
| 3,608,946 | 9/1971 | Erickson et al. | 294/64.1 |
| 3,910,621 | 10/1975 | Hillier | 294/64.1 |
| 4,049,484 | 9/1977 | Priest et al. . | |
| 4,185,814 | 1/1980 | Buchmann et al. | 294/64.1 X |
| 4,881,770 | 11/1989 | Marzinotto et al. . | |
| 5,029,418 | 7/1991 | Bull . | |
| 5,149,162 | 9/1992 | Focke et al. . | |

*Primary Examiner*—Johnny D. Cherry
*Attorney, Agent, or Firm*—Ratner & Prestia; Ira D. Blecker

[57] ABSTRACT

An article handler having a plurality of compartments in a frame with each compartment having a plurality of ribs extending across the compartments. The ribs in adjacent compartments extend perpendicularly to each other to provide resistance against warping of the frame in both directions, thereby maintaining the frame flat. The compartments are covered by filters. Suction is distributed throughout each compartment. When the filters are positioned in proximity to articles, the suction in the compartments is effective to lift the articles.

12 Claims, 4 Drawing Sheets

ARTICLE HANDLER

TECHNICAL FIELD

The present invention relates, in general, to the pick-up and movement of articles and, in particular, to light-weight article handling by means of apparatus using suction for picking up the articles. Although the present invention is particularly suited for the handling and movement of semiconductor ceramic substrates of various sizes, it will be apparent that the present invention has broader application.

BACKGROUND OF THE INVENTION

There is a need to reduce repetitive hand operations in the loading of small flat semiconductor green ceramic (not fired) substrates. Previous designs of apparatus for performing this function have included the use of tubular manifolds with suction cups mounted lengthwise to pick up a single row of substrates from a flat tray. While this arrangement has been successful, it's use has been limited by the single size of one substrate because, for each different substrate size, a different manifold is needed. An article handler which is more versatile and capable of faster operation is desired.

SUMMARY OF THE INVENTION

Accordingly, an article handler, constructed in accordance with the present invention, includes a frame having a base and sidewalls extending along the edges of the base. This article handler also includes a plurality of compartments within the frame adjacent one another and defined by the sidewalls of the frame and walls extending from the sidewalls of the frame. Each compartment has a plurality of ribs extending across the compartment with the ribs in adjacent compartments extending perpendicularly to each other. An article handler, constructed in accordance with the present invention, also includes a plurality of filters, one associated with each of the compartments, individually fitted over the compartments and projecting beyond the sidewalls of the frame. An article handler, constructed in accordance with the present invention, further includes means for conducting a suction to the compartments and a handle attached to the frame.

DESCRIPTION OF THE INVENTION

Figure 1:
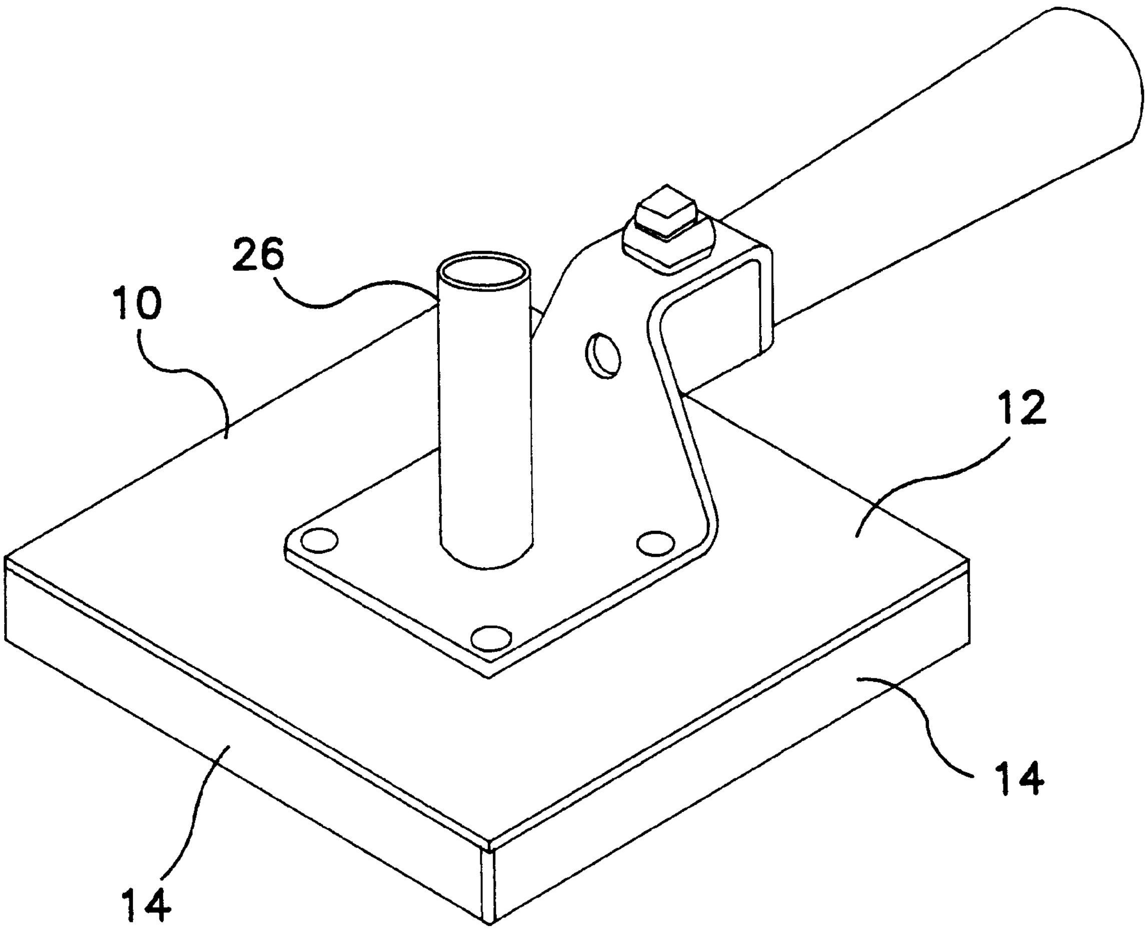
FIG. 1 is a top perspective view of an article handler constructed in accordance with the present invention.

Referring to the drawing, an article handler, constructed in accordance with the present invention, includes a frame 10 having a base 12 and sidewalls 14 extending along the edges of the base. For the embodiment of the invention illustrated by the drawing and being described, frame 10 has a square cross-section and sidewalls 14 of the frame have relief grooves 16.

An article handler, constructed in accordance with the present invention, also includes a plurality of compartments

18 within frame 10 adjacent one another and defined by sidewalls 14 of the frame and walls 20 extending from sidewalls 14. Each compartment 18 has a plurality of ribs 22 extending across the compartment with the ribs in adjacent compartments extending perpendicularly to each other.

For the embodiment of the invention illustrated by the drawing and being described, walls 20, which define compartments 18, extend from the middles of sidewalls 14 of frame 10 to the center of the frame to define four identical compartments of square cross-section. Ribs 22 in compartments 18 extend perpendicularly to opposite sidewalls 14 and walls 20 of the compartments with each rib spaced from at least one of the opposite walls of the compartments.

Figure 4:
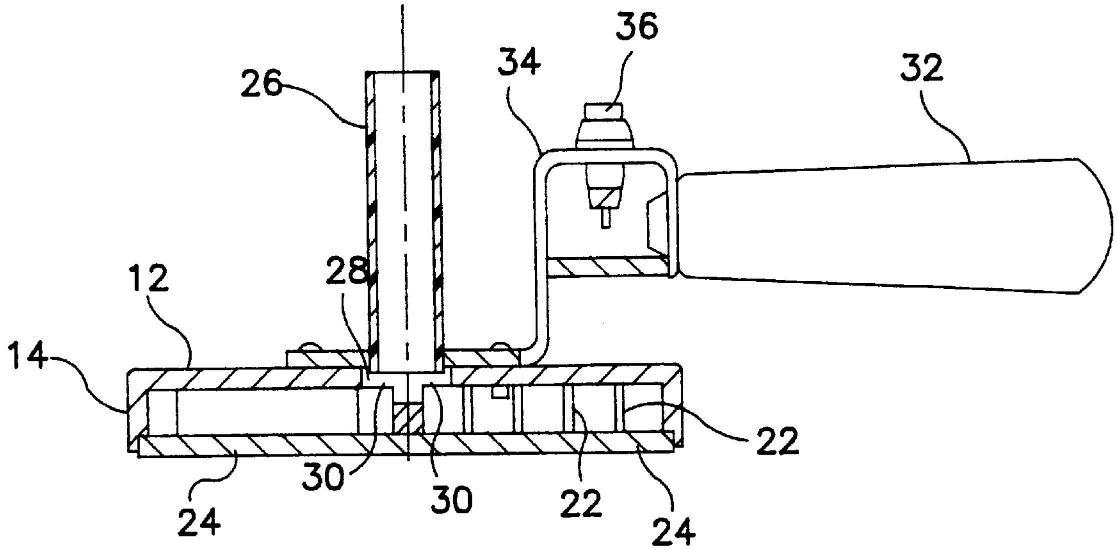
FIG. 4 is side view, partially in section, of the FIG. 1 article handler.

An article handler, constructed in accordance with the present invention, also includes a plurality of filters 24 formed, for example, of a sintered pelletized, polyethylene bead. One such filter is associated with each compartment 18. Filters 24 are individually fitted over compartments 18 and bear against ribs 22 and against 14 of frame 10 in relief grooves 16 to project below the sidewalls of the frame for a disposition of the article handler as shown in FIGS. 1 and 4.

An article handler, constructed in accordance with the present invention, further includes means for conducting a suction to compartments 18. For the embodiment of the invention illustrated by the drawing and being described, such means include a nipple 26 adapted for connection to a suction hose (not shown) which, in turn, is connected to a suction source (not shown), an opening 28 in base 12 of frame 10 within which the nipple is fitted, and openings 30 in walls 20 which define compartments 18 and are in fluid communication with the nipple. Opening 28 in base 12 of frame 10 is at the center of the base of the frame and openings 30 in walls 20 which define compartments 18 are at the intersection of the walls defining the compartments.

An article handler, constructed in accordance with the present invention, further includes a handle 32 attached to frame 10 by a bracket 34 which, in turn, is secured to base 12 of the frame by suitable means. Handle 32 carries a switch 36 which controls application of suction from the suction source.

Figure 2:
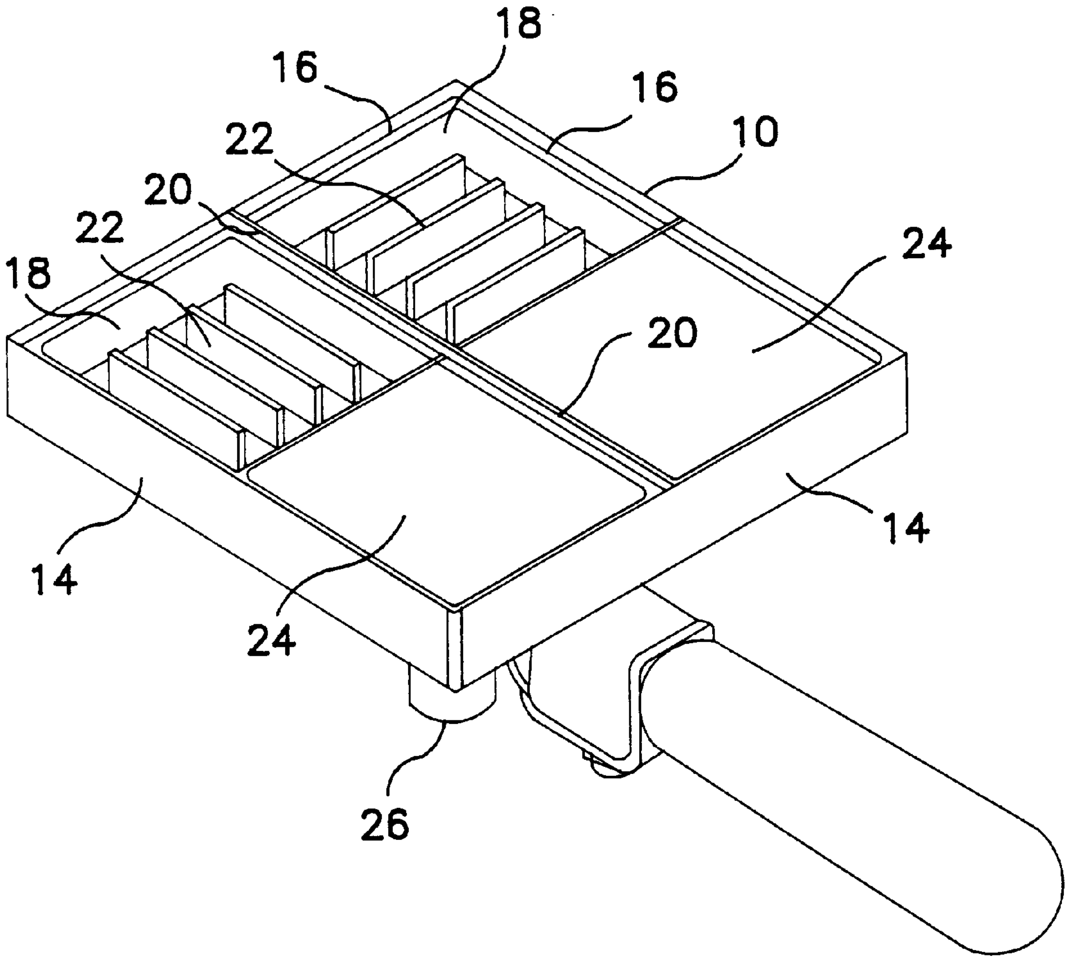
FIG. 2 is a bottom perspective view of the FIG. 1 article handler.
Figure 3:
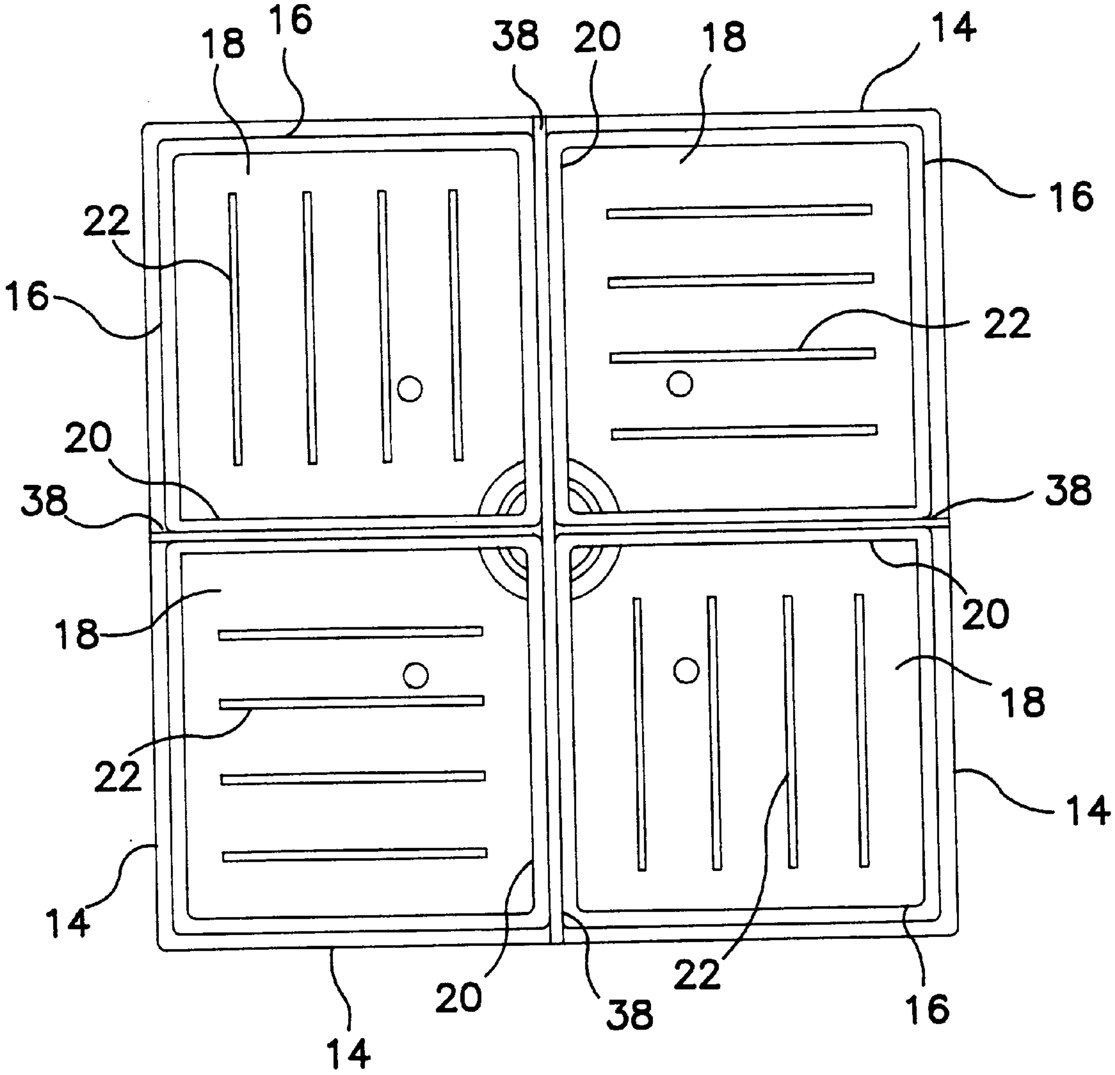
FIG. 3 is a bottom view of the frame of the FIG. 1 article handler.
Figure 5:
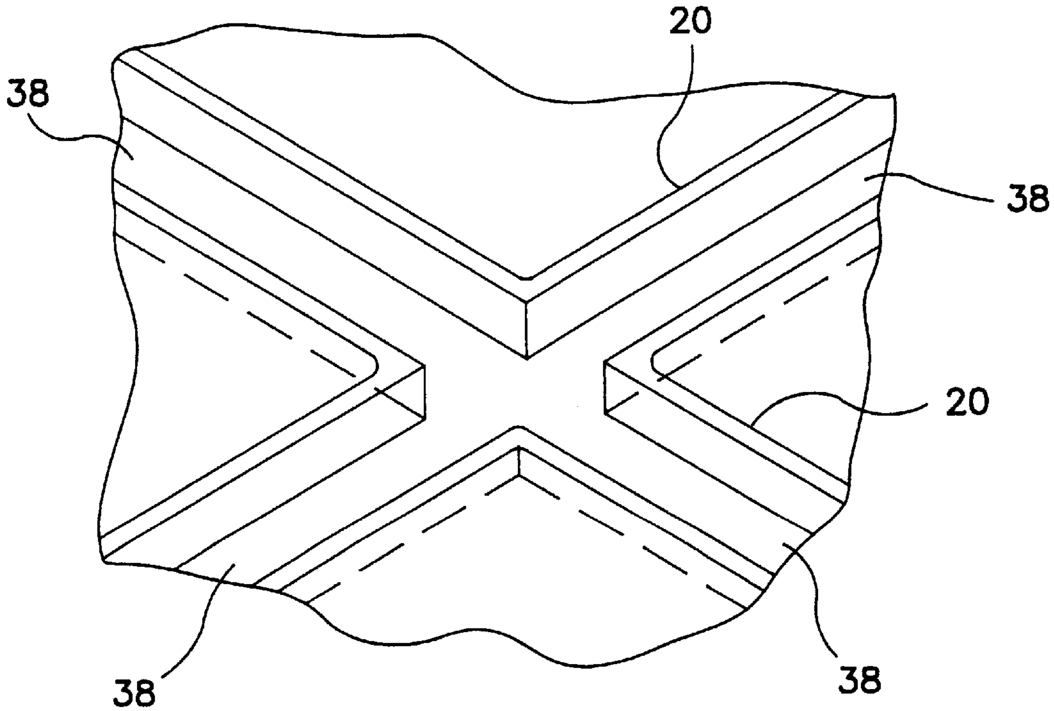
FIG. 5 is a perspective view, on an enlarged scale, of a portion of the frame of the FIG. 1 article handler.

In operation, when switch 36 is closed, suction is applied from the suction source through the suction hose, nipple 26 and opening 28 and openings 30 to compartments 18. With ribs 22 spaced at least from one of the opposite walls of the compartments, and preferably spaced from both opposite walls as shown most clearly in FIGS. 2 and 3, the suction is distributed throughout each compartment. When filters 24 are positioned in proximity to articles, the suction in compartments 18 is effective to lift the articles. important feature of the present invention is the provision of vacuum relief grooves 38 in the bottoms of walls 20 between filters 24. This is shown most clearly in FIG. 5. Vacuum relief grooves 38, extending along the lengths of walls 20, allow limited air flow within frame 10 facilitating the lifting of light-weight articles, such as semiconductor ceramic substrates, from the container in which the articles are supplied without lifting the container also.

The disposition of ribs 22, namely that the ribs in adjacent compartments extend perpendicularly to each other, provides resistance against warping of frame 10 in both directions, thereby maintaining the frame flat. Preferably, frame 10 and ribs 22 are an integral unit formed by molding or machining.

While there has been described a preferred embodiment of the present invention, it should be obvious to those skilled in the art that various modifications and changes can be made without departing from the true spirit and scope of the invention.

What is claimed:

1. An article handler comprising:

a frame having a base and sidewalls extending along the edges of said base;

a plurality of compartments within said frame adjacent one another and defined by said sidewalls of said frame and walls extending from said sidewalls of said frame, each of said compartments having a plurality of ribs extending across said compartment with said ribs in adjacent compartments extending perpendicularly to each other;

a plurality of filters, one associated with each of said compartments, individually fitted over said compartments;

means for conducting a suction to said compartments; and a handle attached to said frame.

2. An article handler according to claim 1 wherein said means for conducting a suction include:

(a) a nipple adapted for connection to a suction hose, (b) an opening in said base of said frame within which said nipple is fitted, and (c) openings in said walls defining said compartments in fluid communication with said nipple.

3. An article handler according to claim 2 wherein:

(a) said frame has a square cross-section, (b) said walls defining said compartments extend from the middles of said sidewalls to the center of said frame to define four identical compartments of square cross-section, and (c) said ribs in said compartments extend perpendicularly to opposite walls of said compartments and with each said rib spaced from at least one of said opposite walls of said compartments.

4. An article handler according to claim 3 wherein said sidewalls of said frame have relief grooves and said filters bear against said ribs and against said sidewalls of said frame in said relief grooves.

5. An article handler according to claim 4 wherein:

(a) said opening in said base of said frame is at the center of said base of said frame, and (b) said openings in said walls defining said compartments are at the intersection of said walls defining said compartments.

6. An article handler according to claim 5 wherein said walls which define said compartments have vacuum relief grooves in the bottoms thereof which extend along the lengths of said walls which define said compartments.

7. An article handler according to claim 1 wherein said sidewalls of said frame have relief grooves and said filters bear against said ribs and against said sidewalls of said frame in said relief grooves.

8. An article handler according to claim 7 wherein:

(a) said frame has a square cross-section, (b) said walls defining said compartments extend from the middles of said sidewalls to the center of said frame to define four identical compartments of square cross-section, and (c) said ribs in said compartments extend perpendicularly to opposite walls of said compartments and with each said rib spaced from at least one of said opposite walls of said compartments.

9. An article handler according to claim 8 wherein said sidewalls of said frame have relief grooves and said filters bear against said ribs and against said sidewalls of said frame in said relief grooves.

10. An article handler according to claim 9 wherein:

(a) an opening in said base of said frame is at the center of said base of said frame, and (b) openings in said walls defining said compartments are at the intersection of said walls defining said compartments.

11. An article handler according to claim 10 wherein said walls which define said compartments have vacuum relief grooves in the bottoms thereof which extend along the lengths of said walls which define said compartments.

12. An article handler according to claim 7 wherein said filters are formed of a sintered, pelletized, polyethylene bead.

* * * * *